(12) United States Patent
Hu et al.

(10) Patent No.: US 11,910,341 B2
(45) Date of Patent: Feb. 20, 2024

(54) METHOD AND APPARATUS FOR SYNCHRONIZATION REFERENCE SOURCE SELECTION

(71) Applicant: LENOVO (BEIJING) LIMITED, Beijing (CN)

(72) Inventors: Jie Hu, Beijing (CN); Jing Han, Beijing (CN); Haiming Wang, Beijing (CN); Lianhai Wu, Beijing (CN); Xiaodong Yu, Beijing (CN); Zhennian Sun, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 159 days.

(21) Appl. No.: 17/276,134

(22) PCT Filed: Oct. 11, 2018

(86) PCT No.: PCT/CN2018/109885
§ 371 (c)(1),
(2) Date: Mar. 13, 2021

(87) PCT Pub. No.: WO2020/073287
PCT Pub. Date: Apr. 16, 2020

(65) Prior Publication Data
US 2022/0053439 A1    Feb. 17, 2022

(51) Int. Cl.
*H04W 56/00*    (2009.01)

(52) U.S. Cl.
CPC ..... *H04W 56/0015* (2013.01); *H04W 56/004* (2013.01)

(58) Field of Classification Search
None
See application file for complete search history.

(56) References Cited

U.S. PATENT DOCUMENTS

| | | | | |
|---|---|---|---|---|
| 2012/0149388 A1* | 6/2012 | West | ...... | H04W 4/029 |
| | | | | 455/456.1 |
| 2015/0009949 A1 | 1/2015 | Khoryaev et al. | | |

(Continued)

FOREIGN PATENT DOCUMENTS

| | | | |
|---|---|---|---|
| WO | 2017167298 A1 | 10/2017 | |
| WO | 2018064179 A1 | 4/2018 | |

(Continued)

OTHER PUBLICATIONS

International Searching Authority, "Notification of Transmittal of the International Search Report and the Written Opinion of the International Searching Authority, or the Declaration", PCT/CN2018/109885, dated Oct. 11, 2018, pp. 1-7.

(Continued)

*Primary Examiner* — Saad Khawar
(74) *Attorney, Agent, or Firm* — Kunzler Bean & Adamson (57) ABSTRACT

Synchronization reference source selection may be used to support advanced services of NR V2X. One method may be performed by a user equipment (UE) in a wireless network. The method includes: broadcasting group information for identifying a wireless communication group including the UE; and broadcasting a special synchronization signal identification for identifying the UE as a synchronization reference source in the wireless communication group.

18 Claims, 8 Drawing Sheets

(56) References Cited

U.S. PATENT DOCUMENTS

| | | |
|---|---|---|
| 2015/0080040 A1 | 3/2015 | Chang |
| 2016/0044616 A1* | 2/2016 | Lee .................. H04W 56/0095 370/350 |
| 2018/0084511 A1 | 3/2018 | Wu et al. |
| 2020/0053524 A1* | 2/2020 | Novlan ................. H04W 84/20 |

FOREIGN PATENT DOCUMENTS

| | | | |
|---|---|---|---|
| WO | 2018143786 A1 | 8/2018 | |
| WO | WO-2020054044 A1 * | 3/2020 | |
| WO | WO-2020069182 A1 * | 4/2020 | ........ H04W 56/0015 |

OTHER PUBLICATIONS

OPPO, Miscellaneous correction for eV2X, 3GPP TSG-RAN WG2 Meeting#103, Draft_R2-1811102, Aug. 20-24, 2018, pp. 1-26, Gothenburg, Sweden.

* cited by examiner

METHOD AND APPARATUS FOR SYNCHRONIZATION REFERENCE SOURCE SELECTION

TECHNICAL FIELD

The present disclosure relates to wireless communication technology, and more particularly, to synchronization reference source selection for a user equipment (UE).

BACKGROUND

To expand the 3rd Generation Partnership Project (3GPP) platform to the automotive industry, the initial standards for vehicle to vehicle (V2V) services were completed in September 2016. Enhancements focusing on additional vehicle-to-everything (V2X) operation scenarios leveraging the cellular infrastructure were completed in March 2017 as 3GPP V2X phase 1 for inclusion in Long Term Evolution (LTE) Release 14 (Rel-14).

3GPP V2X phase 2 in LTE Release 15 (Rel-15) introduces a number of new features in sidelink (SL) communication, including: carrier aggregation, high order modulation, latency reduction, and feasibility study on both transmission diversity and short Transmission Time Interval (TTI) on sidelink communication. All these enhanced features in 3GPP V2X phase 2 are primarily based on LTE and require co-existence with LTE Rel-14 UE in the same resource pool.

For New Radio (NR) networks, the bandwidth is up to 52.6 GHz. The requirements for synchronization under NR are more stringent than those under LTE. Thus, advanced V2X services would require an enhanced NR system and new NR sidelink implementation to meet the stringent requirements.

SUMMARY OF THE DISCLOSURE

According to an embodiment of the present disclosure, a method performed by a UE in a wireless network comprises: broadcasting group information for identifying a wireless communication group including the UE; and broadcasting a special synchronization signal identifier for identifying the UE as a synchronization reference source in the wireless communication group.

According to another embodiment of the present disclosure, a method performed by a UE in a wireless network, which is a member of a wireless communication group, comprises: selecting a synchronization reference source by using a special synchronization signal identifier and group information, wherein the special synchronization signal identifier identifies the leader of the wireless communication group and the group information identifies the wireless communication group.

In an embodiment of the present disclosure, a UE in a wireless network comprises: a processor that determines group information for identifying a wireless communication group including the UE, and also determines a special synchronization signal identifier for identifying the UE as a synchronization reference source in the wireless communication group; and a transmitter that broadcasts the special synchronization signal identifier and the group information.

In another embodiment of the present disclosure, a UE in a wireless network, which is a member of a wireless communication group, comprises: a receiver that detects the presence of a special synchronization signal identifier and the presence of group information; and a processor that selects a synchronization reference source by using a special synchronization signal identifier and the group information, wherein the special synchronization signal identifier identifies the leader of the wireless communication group and the group information identifies the wireless communication group.

BRIEF DESCRIPTION OF THE DRAWINGS

In order to describe the manner in which advantages and features of the present disclosure can be obtained, a description of the disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only forms in which the present disclosure may be practiced. It is to be understood that the same or equivalent functions may be accomplished by different embodiments that are intended to be encompassed within the spirit and scope of the present disclosure.

New Radio (NR) V2X is destined as 3GPP V2X phase 3 and would support advanced services identified by 3GPP System Architecture Working Group 1 (SA WG1). Detailed descriptions of the advanced services are provided as follows:

1. Vehicle platooning enables vehicles to dynamically form a platoon travelling together. All the vehicles in the platoon obtain information from the leading vehicle to manage the platoon. This information allows the vehicles to drive closer than normal in a coordinated manner, travelling together in the same direction.

2. Extended sensors enable exchange of raw or processed data gathered through local vehicle sensors or live video streams captured by onboard cameras, Road Side Units (RSU)s, devices of pedestrians and V2X application servers. Vehicles can increase and improve perception of their environment beyond what their own sensors can detect and have a more broad and holistic view of the local situation. The high data rate is one of its key characteristics.

3. Advanced driving enables semi-automated or full-automated driving. Each vehicle and/or RSU shares its own perception data obtained from its local set of sensors with vehicles in proximity. This allows vehicles to synchronize and coordinate their trajectories or manoeuvres. Each vehicle shares its driving intention with vehicles in proximity.

4. Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements of remote driving.

One objective of the present disclosure is to provide an enhanced sidelink synchronization mechanism so as to support the above advanced services. To achieve synchronization between UEs in a sidelink communication, each UE needs to select a source as a synchronization reference. According to the LTE V2X synchronization mechanism, various sources can be selected as a synchronization reference, e.g., Evolved Node Bs (eNBs), Global Navigation Satellite System (GNSS), UEs transmitting Sidelink Synchronization Signals (SLSSs) with an external source (UEs which receive their synchronization reference from LTE-eNBs or GNSSs), and UEs transmitting SLSSs without a source of their own. As more new use cases are considered, and new synchronization sources are introduced, the current synchronization reference source selection mechanism may not be sufficient for NR V2X. With this observation, it is desired to introduce a new synchronization mechanism for NR V2X UE.

In the legacy LTE V2X synchronization mechanism, the synchronization information transmitted by the UE may be derived either from an Evolved Universal Mobile Telecommunication System (UMTS) Terrestrial Radio Access Network (e-UTRAN) (e.g., selecting a cell as its synchronization reference source), or received from a UE acting as a synchronization reference source for the transmitting UE (the UE acting as a synchronization reference source is referred to as a SyncRef UE), or received from GNSS (e.g., selecting the GNSS as its synchronization reference source). Procedure 100 for selecting/reselecting a synchronization reference source for a UE is described below with reference to FIG. 1.

Figure 1:
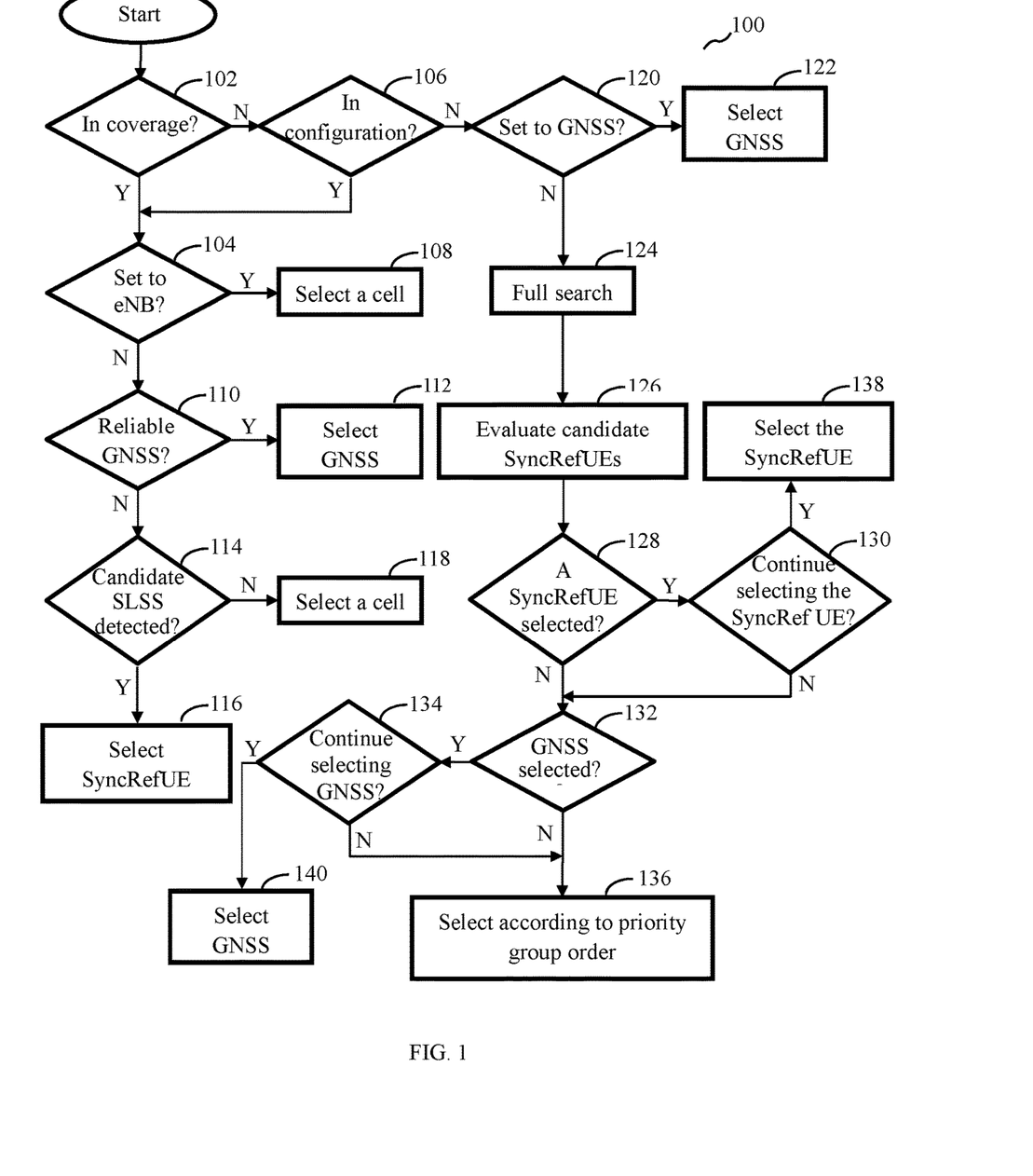
FIG. 1 is a flow chart of a procedure for selecting/reselecting a synchronization reference source for a UE according to the legacy LTE V2X synchronization mechanism.

According to FIG. 1, in step 102, UE is conducting a V2X sidelink communication and determines whether it is in coverage on the frequency for V2X sidelink communication. If the UE is in coverage, the method proceeds to step 104. Otherwise, in step 106, the UE further determines whether the frequency used to transmit the V2X sidelink communication is included in its configuration. If yes, the method proceeds to step 104.

In step 104, UE determines whether its synchronization type (e.g., "typeTxSync") is configured for the frequency concerned and is set to "eNB." If yes, UE selects a cell as its synchronization reference source in step 108. If no, that is the synchronization type for the frequency concerned is not configured or set to "GNSS", the UE further determines whether received GNSS signal is reliable in step 110. If the received GNSS signal is reliable, UE selects the GNSS as its synchronization reference source in step 112. Otherwise, in step 114, UE searches for a candidate SLSS having a Sidelink Synchronization Signal Identifier (SLSSID)=0 on the frequency concerned. If any candidate SLSS is detected, UE then selects a SyncRef UE in step 116 by, for example, applying layer 3 filtering and using Sidelink Reference Signal Received Power (S-RSRP) measurement results. If no candidate SLSS is detected, UE then selects a cell as its synchronization reference source in step 118.

If the determination in step 106 is "no," UE determines whether its synchronization priority (e.g., "syncPriority") is pre-configured and set to "GNSS" in step 120. If yes, the UE then selects the GNSS as its synchronization reference source in step 122. If no, the UE then performs a full search (i.e., covering all subframes and all possible SLSSIDs) to detect candidate SLSSs in step 124. In step 126, UE evaluates a candidate SyncRef UEs corresponding to each detected candidate SLSS by, for example, applying layer 3 filtering and using S-RSRP measurement results.

In step 128, the UE determines whether it has selected a SyncRef UE (the current SyncRef UE) in the previous synchronization reference source selection procedure. If no, the method proceeds to step 132. If yes, in step 130, the UE may determine whether to continue selecting the current SyncRef UE as its synchronization reference source. If any one of the following cases occurs, the UE may consider not selecting the current SyncRef UE and then the method proceeds to step 132, otherwise the UE selects the current SyncRef UE (step 138):

the S-RSRP of the strongest candidate SyncRef UE exceeds the minimum requirement, the strongest candidate SyncRef UE belongs to the same priority group as the current SyncRef UE, and the S-RSRP of the strongest candidate SyncRef UE exceeds the S-RSRP of the current SyncRef UE;

the S-RSRP of the candidate SyncRef UE exceeds the minimum requirement and the candidate SyncRef UE belongs to a higher priority group than the current SyncRef UE;

the GNSS becomes reliable and belongs to a higher priority group than the current SyncRef UE; and the S-RSRP of the current SyncRef UE is less than the minimum requirement.

In step 132, UE determines whether it has selected the GNSS as its synchronization reference source in the previous synchronization reference source selection procedure. If no, the method proceeds to step 136. If yes, in step 134, the UE may determine whether to continue selecting the GNSS as its synchronization reference source. If any one of the following cases occurs, UE may consider not selecting the GNSS and then the method proceeds to step 136, otherwise the UE selects the GNSS (step 140):

the S-RSRP of the candidate SyncRef UE exceeds the minimum requirement and the candidate SyncRef UE belongs to a higher priority group than the GNSS; and the GNSS becomes not reliable.

If UE has not selected a SyncRef UE and has not selected a GNSS as its synchronization reference source, in step 136, the UE selects a synchronization reference source according to a priority group order. For example, if the UE detects one or more SLSSIDs (associated with candidate SyncRef UEs) for which the S-RSRP exceeds the minimum requirement and for which the UE received the corresponding SL V2X message (e.g., MasterInformationBlock-SL-V2X message), or if the UE detects a GNSS that is reliable, the UE acts as follows:

if "syncPriority" is pre-configured and set to "eNB," synchronizing the SyncRef UE to an eNB belonging to a higher priority group than the SyncRef UE synchronized to the GNSS; or if "syncPriority" is pre-configured and set to "GNSS," synchronizing the SyncRef UE to a GNSS belonging to a higher priority group than the SyncRef UE synchronized to the eNB.

For NR advanced services, when the vehicles are travelling on the road, they can dynamically form a platoon, with the platoon manager being responsible for platoon management and sharing real-time traffic information with RSUs and platoon UEs. In vehicle platooning use cases, low-latency and high-reliability data exchanges between platoon members rely on accurate synchronization between UEs. To ensure synchronous communication of the platoon, all the platoon members should synchronize to a unified synchronization reference source. However, if the vehicles in one platooning group use the legacy LTE V2X synchronization mechanism as described above, they may be synchronized to different synchronization reference sources. If these sources are not synchronized to each other, performance will be degraded because of possible message decoding failures.

Figure 2:
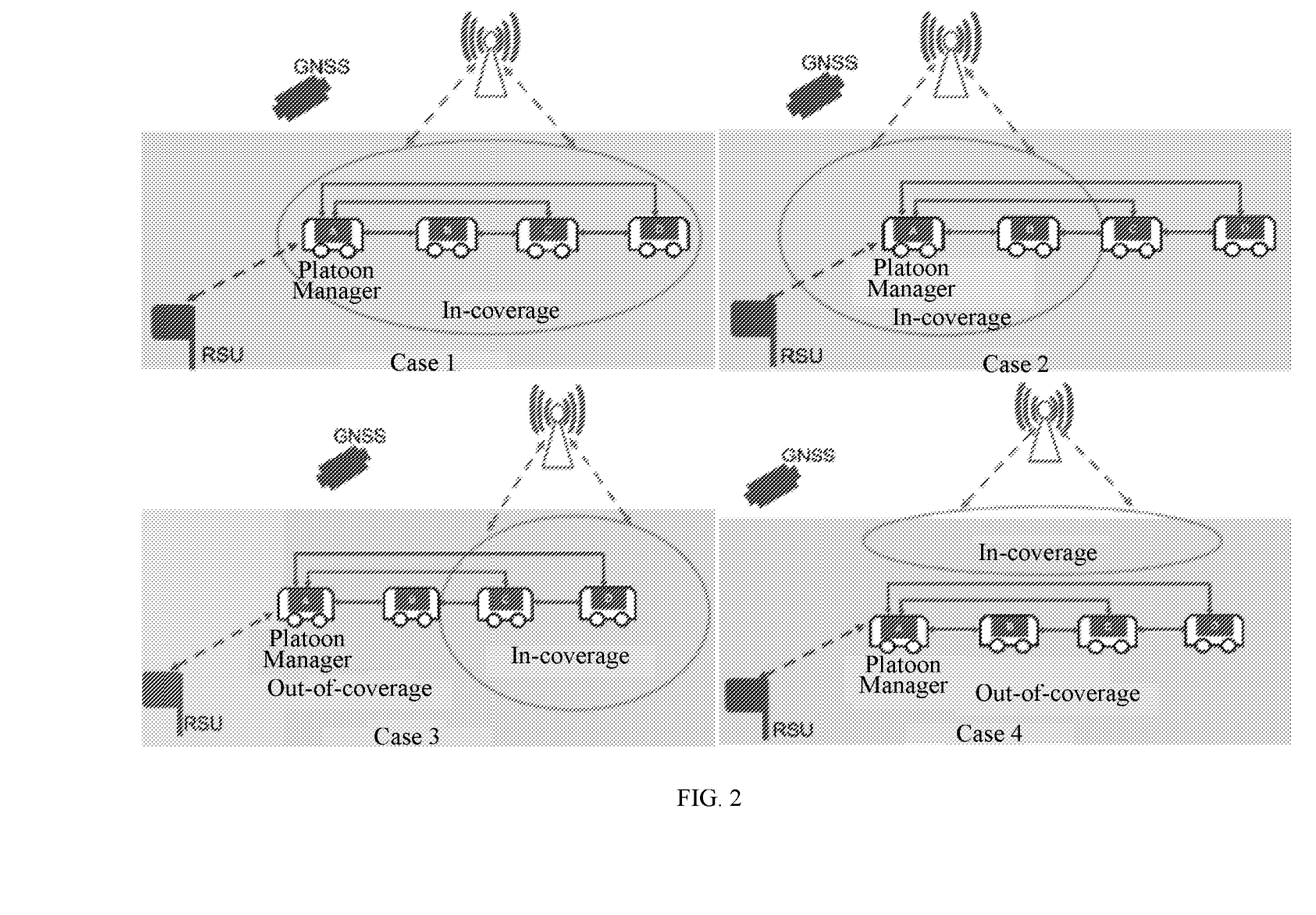
FIG. 2 shows several coverage scenarios of vehicle platooning.

As shown in FIG. 2, for one formed platoon, there may be several different cases due to different network coverage scenarios of vehicle UEs:

Case 1: all the platoon members are in network coverage;
Case 2: the platoon manager is in network coverage and some platoon members are outside network coverage;
Case 3: the platoon manager is outside network coverage and some platoon members are in network coverage; and
Case 4: all the platoon members are outside network coverage.

For the above cases, according to the legacy LTE V2X synchronization mechanism, each UE selects a synchronization reference source independently based on the network configured synchronization priority order (e.g., cell>GNSS>SyncRef UE). As a result, it is possible that different vehicle UEs in the same platoon select different synchronization reference sources due to different network coverage scenarios or vehicle locations. Specifically, for Case 1 (in which UEs are in coverage of a gNB (5G base station)), the gNB can be selected as a synchronization reference source. For those UEs outside network coverage in Cases 2-4, if GNSS is reliable, the GNSS can be selected as a synchronization reference source. When the GNSS signal becomes weak for some vehicle UEs (e.g., vehicles inside a tunnel), a SyncRef UE can be selected as a synchronization reference source.

Moreover, the advanced V2X use cases pose a new challenge in terms of adaptively changing network conditions. If the platoon runs fast on a highway during the trip, the coverage scenario used by the platoon may vary with time, and thus the synchronization reference source thereof may change frequently. Because of this, the higher reliability requirement cannot be met and more power will be consumed for scanning synchronization reference sources.

In other scenarios, from a gNB implementation point of view, the gNB cannot ensure that it is always synchronized to the GNSS. For a UE that is in the coverage of the gNB and is synchronized to the gNB, when the UE is trying to join a platoon while the platoon is on its trip and is synchronized to GNSS, the UE and the platoon may not be able to communicate with each other if the gNB is not synchronized to the GNSS.

Therefore, the legacy LTE V2X synchronization mechanism has difficulty in supporting the advanced NR V2X services. So it is desired to design a new synchronization mechanism to select and maintain a unified synchronization reference source for a group of UEs, especially for vehicle platooning use cases.

In one embodiment, once a wireless communication group of UEs is formed in coverage of a base station (e.g., a gNB) of a wireless network, the base station may select one of the UEs in the group as the leader of the group. In another embodiment, a UE may be pre-configured as the group leader. The UEs can be vehicles, the wireless communication group can be a vehicle platoon, and the group leader can be a platoon manager responsible for platoon management.

UEs in the wireless communication group may communicate with each other via sidelink communication (as shown in FIG. 2). Each UE may be allocated an associated synchronization signal identifier (e.g., an SLSSID). According to an embodiment of the present disclosure, the network may configure a special synchronization signal identifier for a group leader so as to identify the group leader to be the highest synchronization reference source in groupcast transmission, and the special synchronization signal identifier may have a value selected from a predetermined range. The group leader has the highest priority to be selected as a synchronization reference source by members in the group. In one embodiment, the special synchronization signal identifier for the group leader may be set by a base station in the network or pre-configured for each UE (i.e., a pre-configured value stored in each UE). In an embodiment, the special synchronization signal identifier is an SLSSID.

Figure 3:
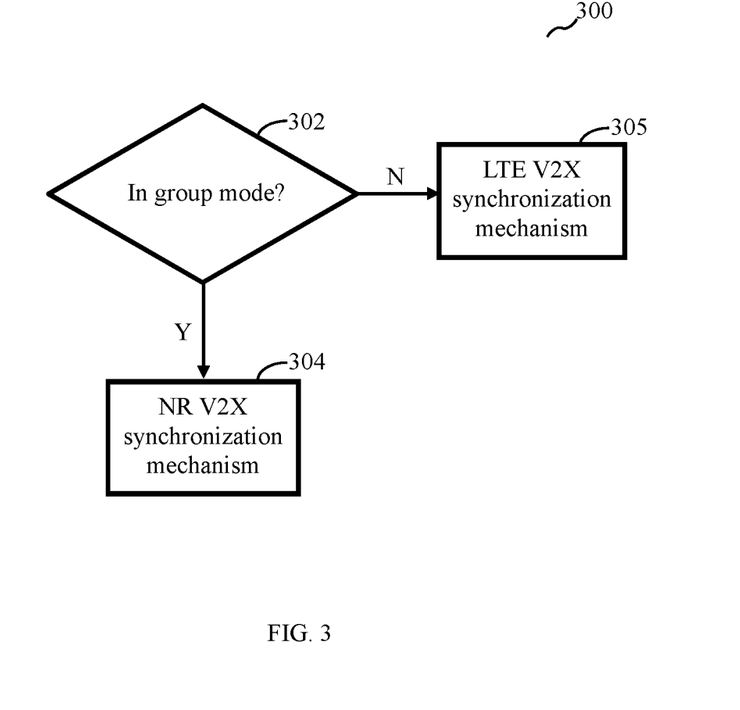
FIG. 3 is a flow chart of a method for selecting a synchronization reference source, which is performed by a UE in a wireless network, according to an embodiment of the present disclosure.

FIG. 3 is a flow chart of a method 300 for selecting a synchronization reference source, which is performed by a UE in a wireless network, according to an embodiment of the present disclosure. The UE may perform this method when it detects a change in the network environment, including but not limited to entering a new network, a new cell, or a new group. In step 302, UE determines whether it is in a group mode. If yes, the UE selects a synchronization reference source according to the NR V2X synchronization mechanism in step 304, which is described in detail below. Otherwise, the UE selects a synchronization reference source according to the legacy LTE V2X synchronization mechanism (e.g., the synchronization mechanism in LTE Rel-14/Rel-15) in step 305.

Figure 4:
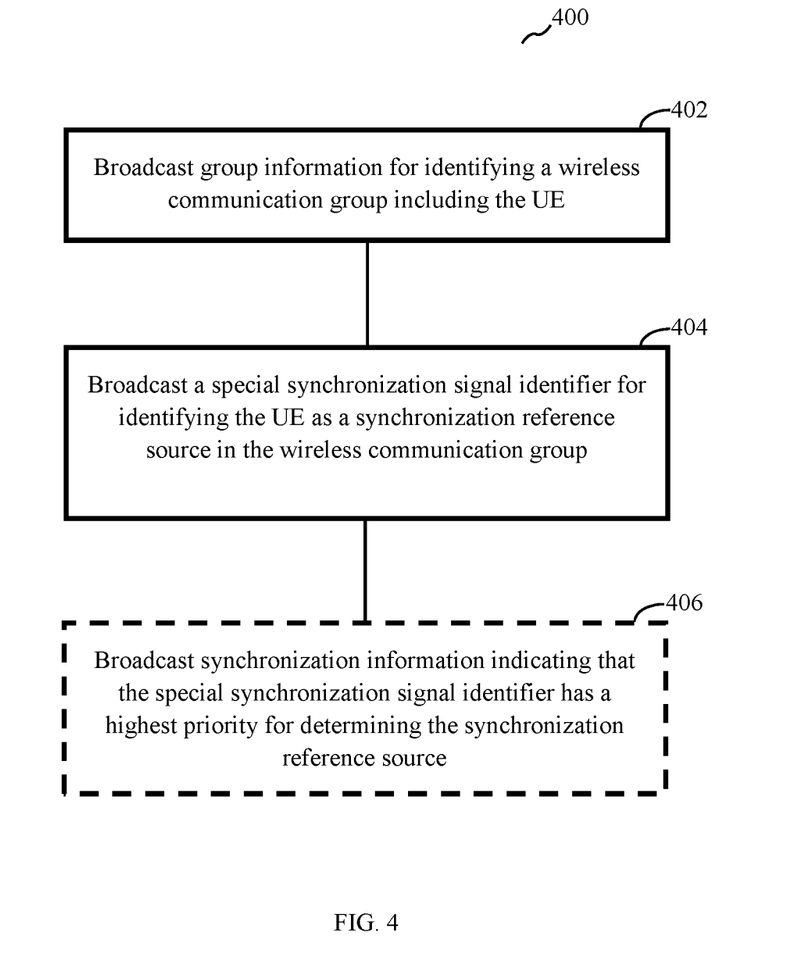
FIG. 4 is a flow chart of a method for broadcasting synchronization reference source, which is performed by a UE in a wireless network, according to an embodiment of the present disclosure.

FIG. 4 is a flow chart of a method 400 for broadcasting a synchronization reference source, which is performed by a UE in a wireless network, according to an embodiment of the present disclosure. In one embodiment, the UE can be a group leader. In another embodiment, the UE can be a standby leader, which acts as a backup when the group leader has a problem.

As shown in FIG. 4, in step 402, the UE broadcasts group information (e.g., a group ID) for identifying a wireless communication group including the UE. When a wireless communication group is formed, a group ID will be assigned to the group and each member in the group will be informed of the group ID. Other UEs in the wireless network receiving the broadcast group information can determine whether they are in the same wireless communication group as the broadcasting UE based on the received group information.

In step 404, the UE broadcasts a special synchronization signal identifier for identifying the UE as a synchronization reference source in the wireless communication group. In one embodiment, the special synchronization signal identifier may be set by a base station in the wireless network, for example, when the wireless communication group is formed and the UE is selected as the leader of the group. In another embodiment, the special synchronization signal identifier may be preconfigured for the UE. According to yet another embodiment, the special synchronization signal identifier can be selected from a plurality of special synchronization signal identifiers which are reserved for synchronization reference sources. Other UEs in the same wireless communication group may select the UE as their synchronization reference source by using the special synchronization signal identifier.

Method 400 may further comprise an optional step 406, in which the UE broadcasts synchronization information indicating that the special synchronization signal identifier has the highest priority to be selected as a synchronization reference source. In an embodiment, the synchronization information is set by a base station in the wireless network when the UE is in coverage or pre-configured in the UE when it is out of coverage. Here, "pre-configured in the UE" refers to a default setting of the UE. In the case where there are several synchronization reference sources (e.g., gNBs, GNSSs, and SyncRef UEs) available, the broadcasting UE has the highest priority to be selected as a synchronization reference source by UEs belonging to the same wireless communication group.

In one embodiment, method 400 may be performed repeatedly. For example, UE repeatedly broadcasts the group information and the special synchronization signal identifier as long as it acts as the group leader. In such case, members in the group and any UE that wants to join the group can receive the broadcast information for selecting a synchronization reference source at any time. In another embodiment, UE may receive synchronization information from each member in the same group indicative of the synchronization reference source used by the respective member. Method 400 may be performed only when the UE detects that members in the wireless communication group do not use the same synchronization reference source.

Figure 5:
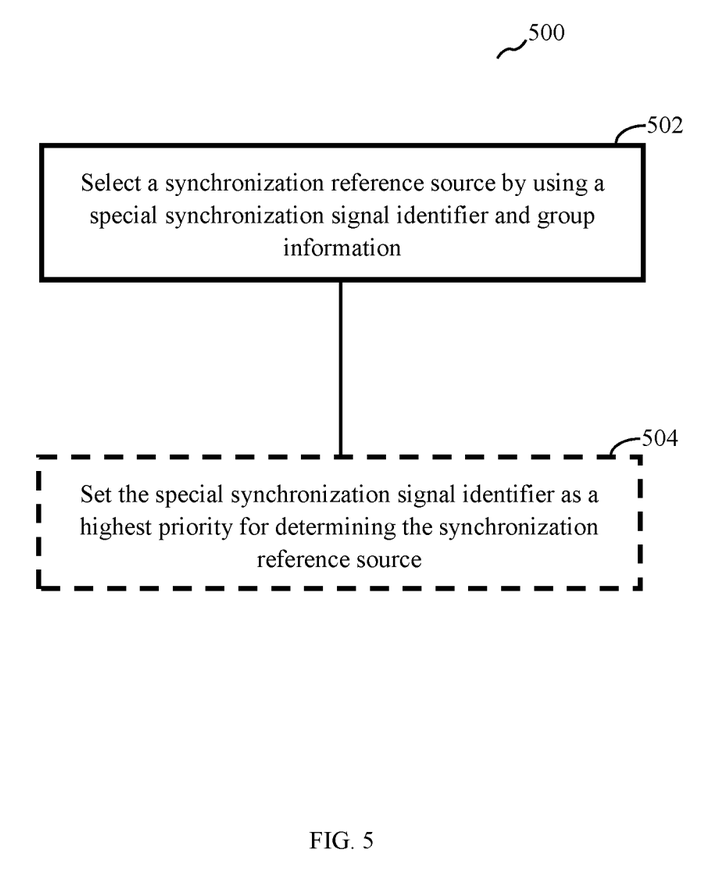
FIG. 5 is a flow chart of a method for selecting a synchronization reference source, which is performed by a UE in a wireless network, according to another embodiment of the present disclosure.

FIG. 5 is a flow chart of a method for selecting a synchronization reference source, which is performed by a UE in a wireless network, according to another embodiment of the present disclosure.

As shown in FIG. 5, in step 502, the UE selects a synchronization reference source by using a special synchronization signal identifier and group information. The special synchronization signal identifier identifies the leader of the wireless communication group, and the group information identifies the wireless communication group. According to an embodiment, the special synchronization signal identifier is set by a base station in the wireless network or is pre-configured for a UE. According to another embodiment, the UE may detect the special synchronization signal identifier in the broadcast information received by the UE. The broadcast information may be broadcast by a UE acting as the group leader.

Method 500 may further include an optional step 504, in which the UE sets the special synchronization signal identifier as the highest priority identifier to be selected as a synchronization reference source. For example, the UE may configure a SyncRef UE with the special synchronization signal identifier as the first priority group.

Figure 6:
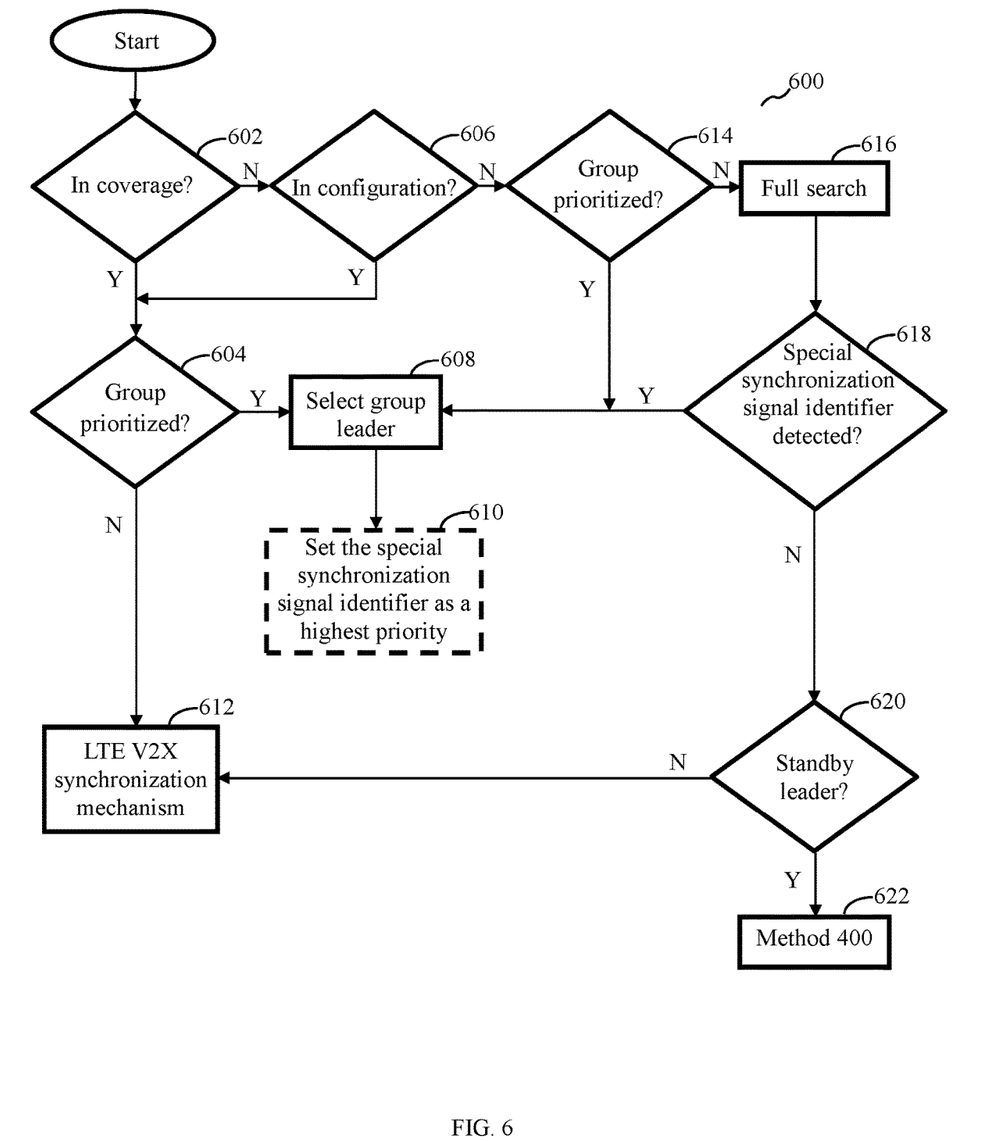
FIG. 6 is a flow chart of a method for selecting a synchronization reference source for a member UE in a wireless communication group according to an embodiment of the present disclosure.

FIG. 6 is a flow chart of a method 600 for selecting a synchronization reference source for a member UE in a wireless communication group according to an embodiment of the present disclosure. The UE is in a group mode, and is conducting a V2X sidelink communication.

According to FIG. 6, in step 602, the UE determines whether it is in coverage on the frequency for V2X sidelink communication. If the UE is in coverage, the method proceeds to step 604. Otherwise, in step 606, the UE further determines whether the frequency used to transmit V2X sidelink communication is included in its configuration. If yes, the method proceeds to step 604.

In step 604, the UE determines whether its synchronization type (e.g., "typeTxSync") is set to "group prioritized." If yes, the UE selects the leader of the wireless communication group as its synchronization reference source in step 608, for example, by using a special synchronization signal identifier and group information, wherein the special synchronization signal identifier and group information may be configured by a base station (e.g., a gNB) when the UE is in coverage or pre-configured in the UE when it is out of coverage. Here, "pre-configured in the UE" refers to a default setting of the UE. The special synchronization signal identifier identifies the leader of the wireless communication group, and the group information (e.g., a group ID) identifies the wireless communication group. The UE may optionally set the special synchronization signal identifier as the highest priority identifier to be selected as a synchronization reference source in step 610. If the synchronization type of the UE is not set to "group prioritized" (i.e., "no" in step 604), the UE may select a synchronization reference source according to the legacy LTE V2X synchronization mechanism (e.g., the synchronization mechanism in LTE Rel-14/Rel-15) in step 612.

If the determination in step 606 is "no," the UE determines whether its synchronization priority is pre-configured as "group prioritized" in step 614. If yes, the method proceeds to step 608, in which the UE selects the leader of the wireless communication group as its synchronization reference source, for example, by using a special synchronization signal identifier and group information written in pre-configuration of the UE. The special synchronization signal identifier identifies the leader of the wireless communication group, and the group information (e.g., a group ID) identifies the wireless communication group.

If the determination in step 614 is "no" (i.e., the synchronization priority is not pre-configured as "group prioritized"), the UE then performs a full search (i.e., covering all subframes and all possible synchronization signal identifiers) to detect a candidate synchronization signal in the broadcast information received by the UE in step 616, by detecting a special synchronization signal identifier(s) which is(are) configured by a base station or pre-configured.

In step 618, the UE determines whether a special synchronization signal identifier is detected in the broadcast information received by the UE. If a special synchronization signal identifier is successfully detected, the method proceeds to step 608. Alternatively, the method may also proceed to step 608 if the UE detects that the broadcast information received by the UE indicates that the special synchronization signal identifier has the highest priority to be selected as a synchronization reference source.

If no special synchronization signal identifier is successfully detected, which may occur when, for example, the group leader has difficulty in transmitting the special synchronization signal identifier, in step 620, the UE then determines whether it is a standby leader, which is configured by a base station or pre-configured. If the UE successfully determines that it was configured as a standby leader, it may perform the method 400 as shown in FIG. 4 (step 622). In this way, the standby leader may act as a common synchronization reference source of the group if the group leader has any problem. If the UE is not a standby leader, the method proceeds to step 612, in which the UE selects a synchronization reference source according to the legacy LTE V2X synchronization mechanism (e.g., the synchronization mechanism in LTE Rel-14/Rel-15).

The NR V2X synchronization mechanism, as illustrated in FIGS. 4-6, can ensure synchronous communication within a vehicle platoon, reduce the power consumption for scanning synchronization reference sources due to different coverage scenarios and vehicle locations, and achieve higher reliability of intra-platoon communication.

According to an embodiment of the present disclosure, the wireless network may comprise a plurality of base stations supporting a plurality of communication standards. For example, the wireless network may be an NR<E coexisting network, and there are both eNBs and gNBs, which can be used as synchronization reference sources by UEs in the wireless network. LTE sidelink is used for basic V2X services which are controlled by eNBs, while NR sidelink is used for advanced services which are controlled by gNBs. Different base stations may be not synchronized to each other.

Thus, base stations in such a network may broadcast timing offset information between two or more base stations of the plurality of base stations for synchronous communication. In one embodiment, the timing offset information may be transmitted in a System Information Block (SIB) message that contains V2X sidelink communication configuration. In another embodiment, the timing offset information may be transmitted in a Radio Resource Control (RRC) message for connection reconfiguration.

UEs in the wireless network may receive the timing offset information from the base stations to coordinate the synchronization information from different cells. For example, UEs may use the timing offset information to align the synchronization information between an eNB and a gNB when the eNB is used for synchronization reference of LTE sidelink and the gNB is used for synchronization reference of NR sidelink.

Figure 7:
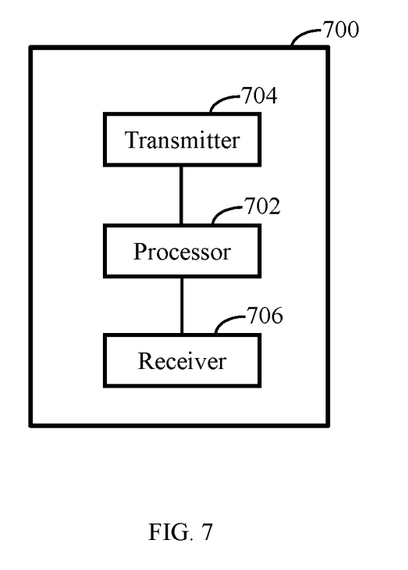
FIG. 7 is a block diagram of a UE in a wireless network, which is configured to perform the method for selecting a synchronization reference source according to an embodiment of the present disclosure.

FIG. 7 is a block diagram of UE 700 in a wireless network, which is configured to perform the method for selecting a synchronization reference source according to an embodiment of the present disclosure, for example, the method shown in FIG. 4. UE 700 can be the leader of a wireless communication group (e.g., a vehicle platoon). As shown in FIG. 7, UE 700 may include processor 702, transmitter 704, and receiver 706.

Processor 702 may determine group information for identifying a wireless communication group including UE 700, and also determine a special synchronization signal identifier for identifying UE 700 as a synchronization reference source in the wireless communication group. According to an embodiment, processor 702 may determine the special synchronization signal identifier according to the configuration set by a base station in the wireless network or according configuration pre-configured in UE 700.

Transmitter 704 may broadcast the special synchronization signal identifier and the group information. Transmitter 704 may further broadcast synchronization information indicating that the special synchronization signal identifier has the highest priority to be selected as a synchronization reference source. The synchronization information is configured by a base station in the wireless network or is pre-configured in UE 700. In one embodiment, transmitter 704 may broadcast the special synchronization signal identifier and the group information repeatedly. In another embodiment, transmitter 704 may broadcast the special synchronization signal identifier and the group information if UE 700 detects that members in the wireless communication group do not use the same synchronization reference source.

According to an embodiment of the present disclosure, the wireless network comprises a plurality of base stations supporting a plurality of communication standards. Receiver 706 may receive timing offset information between two or more base stations of the plurality of base stations for synchronous communication. The timing offset information may be included in an SIB message that contains V2X sidelink communication configuration or in an RRC message for connection reconfiguration which is transmitted by a base station.

Figure 8:
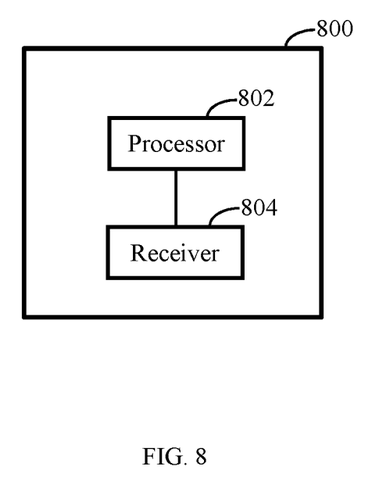
FIG. 8 is a block diagram of a UE in a wireless network, which is configured to perform the method for selecting a synchronization reference source according to another embodiment of the present disclosure.

FIG. 8 is a block diagram of UE 800 in a wireless network, which is configured to perform the method for selecting a synchronization reference source according to another embodiment of the present disclosure, for example, the method shown in FIGS. 5 and 6. UE 800 can be a member of a wireless communication group (e.g., a vehicle platoon). As shown in FIG. 8, UE 800 may include processor 802 and receiver 804.

Receiver 804 may detect the presence of a special synchronization signal identifier and the presence of group information. The special synchronization signal identifier identifies the leader of the wireless communication group and the group information identifies the wireless communication group. The special synchronization signal identifier and the group information may be set by a base station or pre-configured.

Processor 802 may select a synchronization reference source by using the special synchronization signal identifier and the group information. Processor 802 may further set the special synchronization signal identifier as the highest priority identifier to be selected as a synchronization reference source.

According to one embodiment, if a synchronization type (e.g., "typeTxsync") of UE 800 is set to be group prioritized and the special synchronization signal identifier is detected, the processor may select the group leader as the synchronization reference source by using detected special synchronization signal identifier and the group information.

According to another embodiment, if a synchronization type of UE 800 is not set to be group prioritized, receiver 804 may detect the presence of a candidate synchronization signal in the broadcast information received by UE 800. If the special synchronization signal identifier is detected during the process of detecting the presence of the candidate synchronization signal, processor 802 may select a group leader as the synchronization reference source by using the special synchronization signal identifier and the group information.

On the other hand, if the special synchronization signal identifier is not detected, processor 802 may determine whether UE 800 is configured as the standby leader. If UE 800 is configured as the standby leader, UE 800 may be configured as UE 700 as shown in FIG. 7.

According to an embodiment of the present disclosure, the wireless network comprises a plurality of base stations supporting a plurality of communication standards. Receiver 704 may receive timing offset information between two or more base stations of the plurality of base stations for synchronous communication. The timing offset information may be included in an SIB message that contains V2X sidelink communication configuration or in an RRC message for connection reconfiguration which is transmitted by a base station.

An alternative embodiment preferably implements the methods according to embodiments of the present application in a non-transitory, computer-readable storage medium storing computer programmable instructions. The instructions are preferably executed by a computer-executable component preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any other suitable devices. The computer-executable component is preferably a processor (e.g., processor 702 or 802) but the instructions may alternatively or additionally be executed by any suitable dedicated hardware device.

While the present disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments herein are intended to be illustrative, not limiting. Various changes may be made without departing from the spirit and scope of the present disclosure.

The following is what is claimed:

1. A method performed by a user equipment (UE) in a wireless network, the method comprising:
   receiving, from a base station, information indicating a special synchronization signal identifier that is used to indicate a particular UE as a synchronization reference source in a wireless communication group having a highest priority;
   broadcasting group information comprising a group identifier (ID) for identifying the wireless communication group including the UE, wherein the wireless communication group comprises a plurality of UEs, and each UE of the plurality of UEs has a corresponding unique identifier; and
   broadcasting the special synchronization signal identifier indicating that the UE is the synchronization reference source in the wireless communication group having the highest priority.

2. The method of claim 1, wherein the method is performed if the UE detects that members in the wireless communication group do not use the same synchronization reference source.

3. The method of claim 1, wherein the wireless network comprises a plurality of base stations supporting a plurality of communication standards, and the method further comprises receiving timing offset information between two or more base stations of the plurality of base stations, and the timing offset information is included in a system information block (SIB) message or a radio resource control (RRC) message.

4. A method performed by a user equipment (UE) in a wireless network, which is a member of a wireless communication group, the method comprising:
   receiving, from a base station, information indicating a special synchronization signal identifier that is used to indicate a particular UE as a synchronization reference source in the wireless communication group having a highest priority;
   selecting the synchronization reference source by using the special synchronization signal identifier and group information, wherein the wireless communication group comprises a plurality of UEs, and each UE of the plurality of UEs has a corresponding unique identifier,
   wherein the special synchronization signal identifier indicates a leader of the wireless communication group and the group information identifies the wireless communication group.

5. The method of claim 4, further comprising:
   setting the special synchronization signal identifier as a highest priority identifier to be selected as the synchronization reference source.

6. The method of claim 4, wherein selecting the synchronization reference source comprises, if a synchronization type of the UE is set to be group prioritized and the special synchronization signal identifier is detected, selecting the leader as the synchronization reference source by using the special synchronization signal identifier and the group information.

7. The method of claim 4, wherein selecting the synchronization reference source further comprises:
   if a synchronization type of the UE is not set to be group prioritized, detecting presence of a candidate synchronization signal in broadcast information received by the UE.

8. The method of claim 7, wherein selecting the synchronization reference source further comprises:
   during detecting the presence of the candidate synchronization signal, if the special synchronization signal identifier is detected, selecting the leader as the synchronization reference source by using the special synchronization signal identifier and the group information.

9. The method of claim 4, wherein the wireless network comprises a plurality of base stations supporting a plurality of communication standards, and the method further comprises receiving timing offset information between two or more base stations of the plurality of base stations, and the timing offset information is included in a system information block (SIB) message or a radio resource control (RRC) message.

10. A user equipment (UE) in a wireless network, comprising:
    at least one memory; and
    at least one processor coupled with the at least one memory and configured to cause the UE to:
    receive, from a base station, information indicating a special synchronization signal identifier that is used to indicate a particular UE as a synchronization reference source in a wireless communication group having a highest priority;
    determine group information comprising a group identifier (ID) for identifying the wireless communication group including the UE, wherein the wireless communication group comprises a plurality of UEs, each UE of the plurality of UEs has a corresponding unique identifier; and
    broadcast the special synchronization signal identifier and the group information.

11. The UE of claim 10, wherein the at least one processor is configured to cause the UE to broadcast the special synchronization signal identifier and the group information repeatedly.

12. The UE of claim 10, wherein the at least one processor is configured to cause the UE to broadcast the special synchronization signal identifier and the group information if the UE detects that members in the wireless communication group do not use a same synchronization reference source.

13. The UE of claim 10, wherein the wireless network comprises a plurality of base stations supporting a plurality of communication standards, and the UE further comprises a receiver that receives timing offset information between two or more base stations of the plurality of base stations, and the timing offset information is included in a system information block (SIB) message or a radio resource control (RRC) message.

14. A user equipment (UE) in a wireless network, which is a member of a wireless communication group, the UE comprising:
  at least one memory; and
  at least one processor coupled with the at least one memory and configured to cause the UE to:
    receive, from a base station, information indicating a special synchronization signal identifier that is used to indicate a particular UE as a synchronization reference source in a wireless communication group having a highest priority;
    detect presence of the special synchronization signal identifier and presence of group information comprising a group identifier (ID), wherein the wireless communication group comprises a plurality of UEs, each UE of the plurality of UEs has a corresponding unique identifier; and
    select a synchronization reference source by using the special synchronization signal identifier and the group information,
    wherein the special synchronization signal identifier indicates a leader of the wireless communication group and the group information identifies the wireless communication group.

15. The UE of claim 14, wherein, if a synchronization type of the UE is set to be group prioritized and the special synchronization signal identifier is detected, the at least one processor is configured to cause the UE to select the leader as the synchronization reference source by using the special synchronization signal identifier and the group information.

16. The UE of claim 14, wherein, if a synchronization type of the UE is not set to be group prioritized, the at least one processor is configured to cause the UE to detect presence of a candidate synchronization signal in broadcast information.

17. The UE of claim 16, wherein, if the special synchronization signal identifier is detected during detecting the presence of the candidate synchronization signal, the at least one processor is configured to cause the UE to select the leader as the synchronization reference source by using the special synchronization signal identifier and the group information.

18. The UE of claim 14, wherein the wireless network comprises a plurality of base stations supporting a plurality of communication standards, and the receiver further receives timing offset information between two or more base stations of the plurality of base stations, and the timing offset information is included in a system information block (SIB) message or a radio resource control (RRC) message.

* * * * *